United States Patent [19]

Sugiura

[11] Patent Number: 4,481,922
[45] Date of Patent: Nov. 13, 1984

[54] INTAKE PORT STRUCTURE FOR INTERNAL COMBUSTION ENGINES

[75] Inventor: Yasuyuki Sugiura, Hamamatsu, Japan

[73] Assignee: Suzuki Jidosha Kogyo Kabushiki Kaisha, Shizuoka, Japan

[21] Appl. No.: 430,075

[22] Filed: Sep. 30, 1982

[30] Foreign Application Priority Data

Jan. 29, 1982 [JP] Japan .................................. 57-11699

[51] Int. Cl.$^3$ ............................................. F02B 31/00
[52] U.S. Cl. .................... 123/306; 123/308; 123/432; 123/52 M
[58] Field of Search ............ 123/432, 308, 306, 52 M

[56] References Cited

U.S. PATENT DOCUMENTS

| 3,171,395 | 3/1965 | Bartholomew | 123/52 M |
| 3,678,905 | 7/1972 | Diehl | 123/432 |
| 3,918,419 | 11/1975 | Dolza, Sr. | 123/432 |
| 4,164,205 | 8/1979 | Asanomi | 123/432 |
| 4,244,333 | 1/1981 | Matsumoto | 123/52 M |
| 4,271,795 | 6/1981 | Nakagawa et al. | 123/432 |
| 4,276,862 | 7/1981 | Matsumoto | 123/52 M |

*Primary Examiner*—Craig R. Feinberg
*Assistant Examiner*—David A. Okonsky
*Attorney, Agent, or Firm*—Flynn, Thiel, Boutell & Tanis

[57] ABSTRACT

An intake manifold for an internal combustion engine having a plurality of cylinders is composed of a primary intake manifold assembly including a plurality of primary branch pipes extending from a two-barrel carburetor to the cylinders, respectively, and a secondary intake manifold assembly including a plurality of secondary branch pipes extending from the two-barrel carburetor to the cylinders, respectively. The primary and secondary branch pipes are joined together immediately upstream of intake ports opening into the combustion chambers. The primary and secondary branch pipes are dimensioned to meet the relationship of $(n-1)S_1 \leq S_2$ where $S_1$ is the cross-sectional area of each of said primary branch pipes, $S_2$ is the cross-sectional area of each of said secondary branch pipes, and $n$ is the number of said cylinders.

2 Claims, 3 Drawing Figures

INTAKE PORT STRUCTURE FOR INTERNAL COMBUSTION ENGINES

BACKGROUND OF THE INVENTION

The present invention relates to an intake port structure for an internal combustion engine having a plurality of cylinders.

There are known internal combustion engines having an intake system composed of a primary intake passage for supplying an air-fuel mixture to an engine cylinder when the engine operates under a full range of loads and a secondary intake passage for supplying an additional air-fuel mixture to the engine cylinder when the engine operates under relatively high loads. Where such an intake system is incorporated in an internal combustion engine having a plurality of cylinders, the air-fuel mixture tends to flow back from the primary intake passages coupled to those cylinders having closed intake valves as leakage into their secondary intake passages, and then into a secondary intake passage connected to a cylinder with its intake valve open. Such an air-fuel mixture leakage then flows into the latter cylinder, lowering the speed at which an air-fuel mixture flows from the primary intake passage into the cylinder, and hence weakening the air-fuel mixture swirl created within the combustion chamber.

Prior efforts to prevent such an air-fuel mixture leakage through the secondary intake passages include check valves or throttle valves mounted in the secondary intake passages, respectively. Use of check valves, however, increases resistance to the flow of the air-fuel mixture through the secondary intake passages. The throttle valves are also disadvantageous in that the entire construction becomes quite complex.

SUMMARY OF THE INVENTION

It is an object of the present invention to provide an intake port structure for an internal combustion engine having a plurality of cylinders, the intake port structure including primary and secondary manifold branch pipes dimensioned to enable an air-fuel mixture leakage to strengthen an air-fuel mixture swirl in combustion chambers for improved fuel combustion therein.

According to the present invention, an intake port structure for an internal combustion engine having a plurality of cylinders, comprises a cylinder head having a plurality of combustion chambers defined in a surface thereof and a plurality of intake ports communicating respectively with the combustion chambers, a primary intake manifold assembly having a plurality of primary branch pipes communicating respectively with the intake ports, and a secondary intake manifold assembly having a plurality of secondary branch pipes communicating respectively with the intake ports. The primary and secondary branch pipes are free of check or throttle valves and are dimensioned to meet the relationship of $(n-1) S_1 \leq S_2$, where $S_1$ is the cross-sectional area of each of the primary branch pipes, $S_2$ is the cross-sectional area of each of the secondary branch pipes, and n is the number of the cylinders.

When the engine operates under small and medium loads, the air-fuel mixture flowing from the primary branch pipes produces in the combustion chambers strong swirls reinforced by an air-fuel mixture leakage flowing out of the secondary branch pipes. The strong swirls enable the air-fuel mixture in the combustion chambers to be improved and combusted rapidly, resulting in raised limitations on the leanness of the air-fuel mixture and on exhaust gas recirculation. Therefore, the exhaust gas is more purified, the drivability is improved, and the fuel economy is improved.

Since neither a check valve nor throttle valve is employed, no increased resistant to the flow of an air-fuel mixture is involved, and no reduction in the engine output power is caused. The intake port structure of the invention is also simple in construction and is made up of a minimum number of parts.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
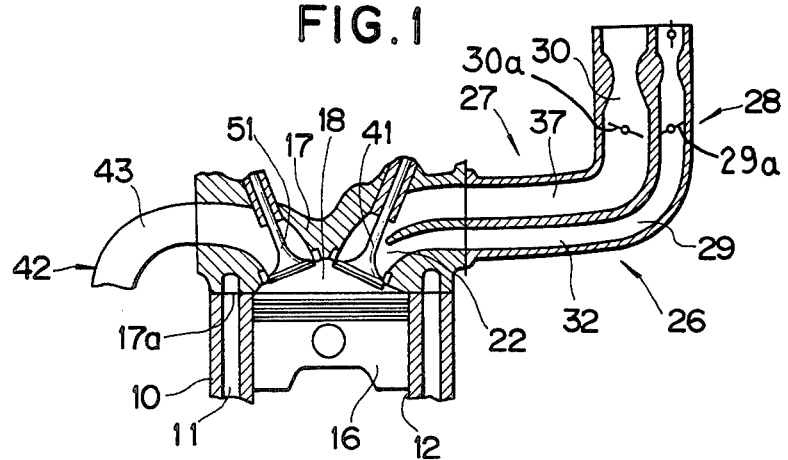
FIG. 1 is a cross-sectional view of an internal combustion emgine incorporating an intake port structure according to the present invention.
Figure 2:
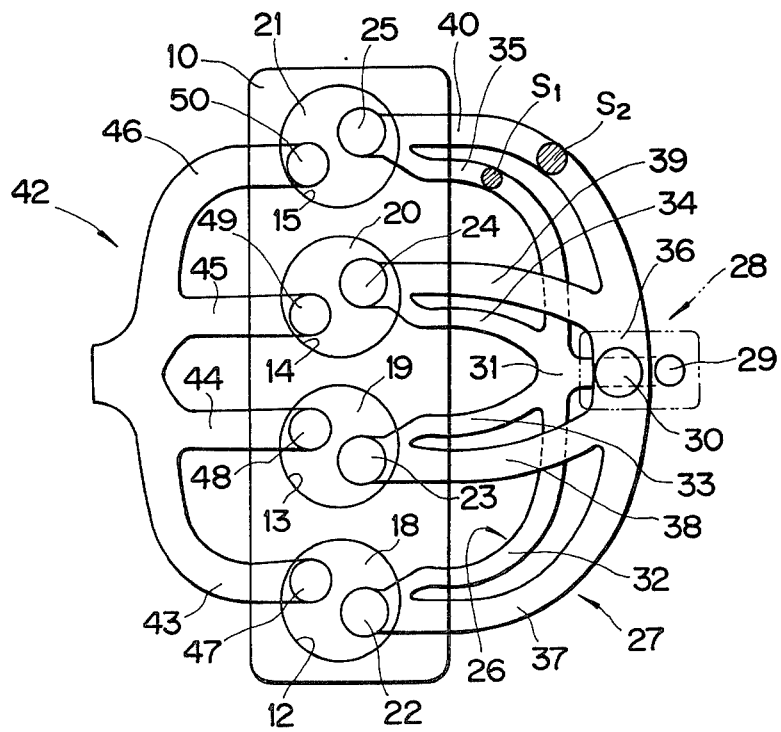
FIG. 2 is a plan view of the intake port structure of the invention.

As shown in FIGS. 1 and 2, and internal combustion engine in which the present invention is incorporated comprises a cylinder block 10 having a water jacket 11 and a plurality (four in the illustrated embodiment) of cylinders 12, 13, 14, 15 in which pistons 16 are telescopically movable. A cylinder head 17 is mounted on the cylinder block 10 and has a plurality (four in the illustrated embodiment) of combustion chambers 18, 19, 20, 21 opening above and communicating with the cylinders 12, 13, 14, 15, respectively. The cylinder head 17 also has a plurality (four in the illustrated embodiment) of intake ports 22, 23, 24, 25 opening respectively into the combustion chambers 18, 19, 20, 21.

An intake manifold comprises a primary intake manifold assembly 26 for supplying an air-fuel mixture into the combustion chambers 18 through 21 when the engine operates under a full range of loads, and a secondary intake manifold assembly 27 for supplying an air-ful mixture into the combustion chambers 18 through 21 when the engine operates under relatively high loads, the primary and secondary intake manifold assemblies 26, 27 extending from a two-barrel carburetor 28. The two-barrel carburetor 28 includes a primary passage 29 connected to the primary intake manifold assembly 26 and a secondary passage 30 connected to the secondary intake manifold assembly 27. Carburetor passages 29 and 30 are independent of one another and have conventional throttle valves 29a and 30a associated with the respective passages. The primary intake manifold assembly 26 is composed of four primary branch pipes 32, 33, 34, 35 extending from a primary common pipe 31 communicating with the primary passage 29 of the carburetor 28 to the intake ports 22, 23, 24, 25, respectively. Likewise, the secondary intake manifold assembly 27 is composed of four secondary branch pipes 37, 38, 39, 40 extending from a secondary common pipe 36 communicating with the secondary passage 30 of the carburetor 28 to the intake ports 22, 23, 24, 25, respectively. The primary branch pipes 32 through 35 and the secondary branch pipes 37 through 40 are joined together, respectively, immediately upstream of the intake ports 22 through 25, respectively, as shown in FIG. 2.

Each of the primary branch pipes 32 through 35 has an end portion opening into one of the combustion chambers 18 through 21 in a direction tangential to the combustion chamber and extending as parallel as possible to a deck surface 17a of the cylinder head 17. Each primary branch pipe has a relatively small cross-sectional area $S_1$. With this construction, an air-fuel mixture flows out of each primary branch pipe into the combustion chamber as a horizontal swirl which is strong and resistant to being crushed, so that the air-fuel mixture can be combusted thoroughly.

Each of the secondary branch pipes 37 through 40 has a relatively large cross-sectional area $S_2$ and includes an end portion opening into one of the combustion chambers 18 through 21 in a direction substantially perpendicularly to the deck surface 17a for an increased charging effeciency.

The cross-sectional area $S_1$ of each of the primary branch pipes 32 through 35 and the cross-sectional area $S_2$ of each of the secondary branch pipes 37 through 40 are selected to meet the following relationship:

$$(n-1)S_1 \leq S_2$$

where n is the number of engine cylinders.

In the illustrated embodiment, since the engine has four cylinders 12 through 15, the cross-sectional areas $S_1$, $S_2$ are selected to have the relationship of $3S_1 \leq S_2$. Thus, each secondary branch pipe is sized to have a cross-sectional area which is equal to or greater than the total cross-sectional area of three primary branch pipes. With this arrangement, the speed at which the air-fuel mixture leakage flows through the secondary branch pipes is lowered to enable the air-fuel mixture flowing through each primary branch pipe to lead such an air-fuel mixture leakage to create and strengthen a swirl in the combustion chambers.

The intake ports 22 through 25 can be opened and closed by intake valves 41 slidably supported in the cylinder head 17. An exhaust manifold 42 has four branch pipes 43, 44, 45, 46 communicating respectively with the combustion chambers 18 through 21 through exhaust ports 47, 48, 49, 50, respectively, which can be opened and closed by exhaust valves 51 slidably supported in the cylinder head 17.

When the internal combustion engine operates under a relatively small or medium load, an air-fuel mixture flows through only the primary carburetor passage 29 into and through the primary branch pipes 32 through 35 into the respective combustion chambers 18 through 21 in which the air-fuel mixture generates strong swirls as the mixture flows at a high speed due to the relatively small cross-sectional area $S_1$ of the primary branch pipes. When the piston 16 in one of the cylinders, 12 for example, is in its intake stroke, an air-fuel mixture in each of the primary branch passages 33, 34, 35 for the other cylinders 13, 14, 15 which are then closed by the intake valves 41 is caused to flow back as a secondary air-fuel mixture leakage through the secondary branch pipes 38, 39, 40 into the secondary branch pipe 37. Such a secondary air-fuel mixture leakage then flows into the combustion chamber 18 in the same direction as that in which a normal secondary air-fuel mixture would flow from the secondary branch pipe 37 into the combustion chamber 18, and hence has a tendency to deaden the air-fuel mixture supplied from the primary branch pipe 32.

Since the sum of the cross-sectional areas $S_1$ of the primary branch pipes 33, 34, 35 is equal to or smaller than the cross-sectional area $S_2$ of the secondary branch pipe 37, the air-fuel mixture leakage supplied through secondary branch pipe 37 flows at a lower speed than that at which the air-fuel mixture flows out of the primary branch pipe 32. Accordingly, the secondary air-fuel mixture leakage is so weak that it fails to disturb the swirl created by the primary air-fuel mixture, by instead is attracted to the swirl to thereby strengthen the latter. This strengthened swirl assists the air-fuel mixture in becoming combusted more thoroughly in the combustion chamber 18.

When the engine operates under a higher load, air-fuel mixtures flow from both carburetor passages 29 and 30 into and through the respective primary and secondary manifolds 26, 27 into the combustion chambers 18 through 21. Since each of the secondary branch pipes 37 through 40 has the larger cross-sectional area $S_2$ and opens into the combustion chamber substantially perpendicularly, the air-fuel mixture is supplied therethrough in a relatively large amount, with the results that the charging efficiency is prevented from being reduced and the engine can produce a sufficient output power to meet the higher load.

Figure 3:
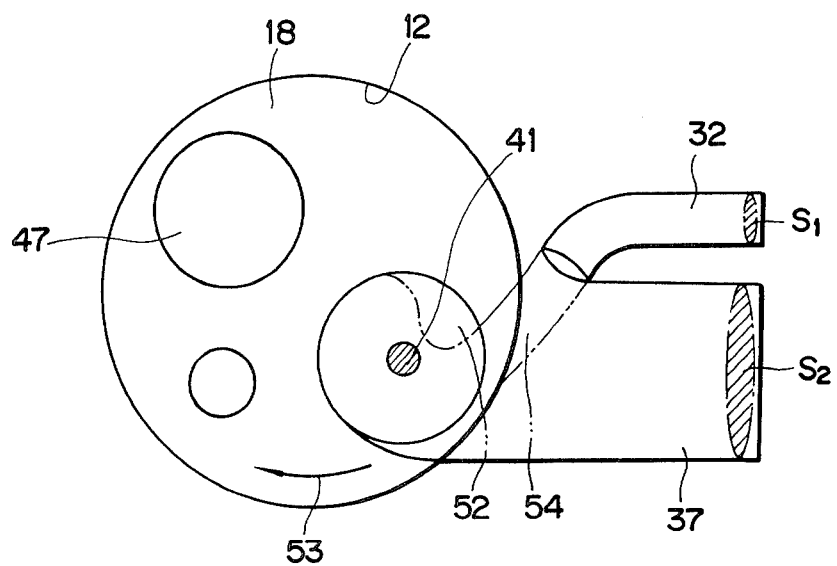
FIG. 3 is an enlarged plan view illustrative of an intake port of the intake port structure shown in FIG. 2.

As shown in FIG. 3, the combustion chamber 18 may have a wall 52 projecting therein at a position where the primary and secondary branch pipes 32, 37 are joined for thereby deflecting the air-fuel mixture flowing out of the secondary branch pipe 37 to form an air-fuel swirl along the direction of the arrow 53 in the combustion chamber 18. The end portion of the primary branch pipe 32 which opens into the combustion chamber 18 may include a groove 54 for guiding the air-fuel mixture from the primary branch pipe 32 in a desired direction to reinforce the air-fuel mixture swirl created in the combustion chamber 18. This arrangement of FIG. 3 is described in copending application Ser. No. 370,325, as owned by the Assignee of this invention.

The secondary branch pipes 37 through 40 may be of an equal diameter throughout their length as shown in FIG. 2, or may have an increased diameter to provide the desired cross-sectional area at the junctions where the secondary and primary branch pipes are joined together.

While in the illustrated embodiment the intake port structure of the invention has been described as being incorporated in a four-cylinder internal combustion engine, the present invention is also applicable to internal combustion engines having two or more cylinders.

Although a certain preferred embodiment has been shown and described in detail, it should be understood that many changes and modifications may be made therein without departing from the scope of the appended claims.

What is claimed is:

1. An intake port structure for an internal combustion engine having a plurality of cylinders each having a combustion chamber, comprising:
   (a) two-barrel carburetor means including a primary passage with a primary throttle valve connected to a primary intake manifold assembly for supplying an air-fuel mixture into each of said combustion chambers in a full range of load conditions, and a secondary passage with a secondary throttle valve connected to a secondary intake manifold assembly for supplying an air-fuel mixture into each of said combustion chambers under relatively high load conditions;

(b) said primary intake manifold assembly being composed of a plurality of primary branch passage extending from a primary common pipe to intake ports defined in a cylinder head communicating respectively with said combustion chambers;

(c) said secondary intake manifold assembly being composed of a plurality of secondary branch passages extending from a secondary common pipe to said intake ports defined in said cylinder head communicating respectively with said combustion chambers;

(d) said primary branch passages and said secondary branch passages being respectively joined together immediately upstream of said intake ports, each of said primary branch passages terminating in an outlet which opens directly into a respective one of said secondary branch passages upstream of but closely adjacent the respective intake port;

(e) said cylinder head defining a surface which extends substantially perpendicularly with respect to the longitudinal axis of each of the respective combustion chambers, each of said primary branch passages having an end portion which terminates in said outlet and is oriented approximately in parallel relationship with said surface, said outlet of each of said primary branch passages being oriented substantially tangentially to the respective combustion chamber, each of said secondary branch passages terminating in an end portion which opens into the respective said combustion chamber in a direction which is transverse to said surface;

(f) a wall projecting sidewardly into the end portion of each of said secondary branch passages adjacent to a respective intake valve stem and adjacent to but downstream of the respective outlet for sidewardly deflecting an air-fuel mixture flowing from said primary and secondary branch passages for substantially tangential entry into said combustion chambers to form a circumferential flow of air-fuel mixture in the combustion chambers;

(g) each of said secondary branch passages having a groove extending from said outlet along an upstream side of said wall for guiding the air-fuel mixture flowing from the respective primary branch passage into the respective combustion chamber; and (h) said primary and secondary branch passages being dimensioned to meet the relationship of $(n-1)S_1 \leqq S_2$ where $S_1$ is the cross-sectional area of each of said primary branch passages, $S_2$ is the cross-sectional area of each of said secondary branch passages, and n is the number of said cylinders.

2. An intake port structure according to claim 1, wherein said engine has four said cylinders so that the primary and secondary branch passages are dimensioned according to the relationship of $3S_1 \leqq S_2$.

* * * * *